3,226,239
CONFECTIONERS' MOLDING STARCH
Thomas J. Schoch, La Grange, Ill., and John A. Korth, Wilton, Conn., assignors to Corn Products Company, New York, N.Y., a corporation of Delaware
No Drawing. Filed June 4, 1963, Ser. No. 285,242
6 Claims. (Cl. 106—38.5)

This application is a continuation-in-part of co-pending application U.S. Serial Number 91,608, filed February 27, 1961, now abandoned.

This invention relates to confectioners' molding starch, of the type used in the formation of cast gum confections such as jelly beans, gumdrops and the like.

One stage in the production of the aforesaid types of confections involves pouring of the hot fluid paste containing a sugar syrup and gel-forming colloid into starch molds. On cooling, the paste sets into a solid gel, taking the shape of the mold impressions.

The starch molds used in the production of this kind of confection are conventionally made by impressing the desired shapes or forms into a flat bed consisting essentially of powdered starch which has been spread out uniformly in a tray or the like. The molding starch must possess certain properties which may be categorized as (1) the ability of the starch particles to cling together or cohere to give a plastic mass, (2) the ability of this plastic mass to be made into a mold, i.e., take a sharply-defined impression, and (3) the quality of non-adhesion to the hot gum paste or the cooled gel. The first two of these properties may be simply demonstrated by the ease with which a good molding starch can be packed or molded by hand into a firm coherent "snow-ball."

Ordinary corn starch per se is not generally used as a molding starch because it does not by itself fulfill these requirements. For this reason, powdered corn starch which is to be used as a confectioners' molding starch is conventionally admixed with a small amount of oily or waxy material, in order to impart the requisite properties to the resulting composition. Mineral oil especially has been used for this purpose, though corn or coconut oil, waxes, tallow and similar hydrophobic materials have been suggested.

From the prior art, it would appear that the oily or waxy material, mineral oil for example, forms a thin layer around and between the individual starch granules. The naturally hydrophobic character of the mineral oil—or other fatty or waxy material that might be used—would therefore impart a hydrophobic surface to the normally hydrophilic starch granules, thus preventing them from being wetted by the hot syrupy paste or from sticking unduly to the cooled solidified gel. In addition, the oily hydrophobic surface of the granules would cause them to cohere or stick together, thus imparting the firm, plastic, almost putty-like character desired in a molding starch.

In seeking a starch formulation which would perform effectively as a molding starch without the incorporation of mineral or vegetable oils or waxes, we made the discovery that a mixture of powdered starch, e.g. corn starch, with certain esters of citric acid met the aforementioned requirements and proved in practice to be a very superior confectioners' molding starch. Among the citric acid esters which proved satisfactory were triethyl citrate (commonly referred to as ethyl citrate), acetyl triethyl citrate, and acetyl tributyl citrate. Tri-normal-propyl and tri-iso-propyl citrates, and their acetyl derivatives were likewise found to be effective. However, these latter materials are not presently available in commercial quantities. It is of interest that monopropyl citrate (prepared according to the method of Valteich et al., Food Technology, vol. 8, page 6 (1954)), does not in any degree impart the desired plastic or moldable property to dry powdered starch. Hence it would appear that only the citric acid triesters of the lower monohydric aliphatic alcohols of 2 to 4 carbon atoms, and the acetyl derivatives of these triesters, are effective for the production of confectionery molding starch. From prior art, it would not be suspected that these materials would impart the desired plastic properties and water repellency to powdered starch, since none of these materials possess the long hydrocarbon chains characteristic of the mineral and vegetable oils and waxes heretofore used for the formulation of confectioners' molding starches. Indeed, triethyl citrate is appreciably soluble in water and would therefore appear to be completely unsuitable as a component of a molding starch. However, despite these contrary predictions based on prior art, the fact remains that molding starch compositions produced in accordance with our invention, using citric acid triesters of lower monohydric aliphatic alcohols of 2 to 4 carbon atoms such as triethyl citrate, acetyl triethyl citrate, acetyl tributyl citrate, tripropyl citrate, or acetyl tripropyl citrate, adequately meet all of the important requirements for such use, including firmness, plasticity, non-adhesion with the hot syrup or the cooled gel, and the ability to take and maintain an accurate impression of a pattern molded or pressed into the bed of starch.

The molding starch of our invention can be produced very simply by incorporating any of these citrate esters into powdered starch in any suitable manner, the amount of the citrate ester in the final product being of the order of 0.1% to 0.25% of the weight of the starch. We prefer to spray the citrate ester with any conventional atomizer onto a small amount of powdered corn starch, and then blend this resulting mixture with a larger volume of powdered corn starch. It is of course understood that effective blending must be used, in order to distribute the citrate ester uniformly and homogeneously over all the starch granules present. Conventional mixers may be used for these operations.

Although corn starch is ordinarily used in this country for the production of confectioner's molding starch, this process is equally applicable to other species of powdered starches, e.g., to wheat starch etc.

A further advantage of our improved molding starch is the fact that the added citrate esters are perfectly stable, do not deteriorate or decompose with time, and do not acquire objectionable off-flavors or odors. Other and older types of molding starches, particularly those in which the oil contains unsaturated hydrocarbon chains, rapidly develop rancid odors and flavors which may be imparted to the cast gum confection.

Therefore, the practice of our invention results in the production of an improved confectioners' molding starch which has the following properties: (1) it receives and retains sharp and accurate impressions, (2) it does not adhere to the cast gum confection, (3) it does not contain mineral or other oil, and (4) it is not subject to deteriorative changes in odor and flavor.

We claim:

1. A confectioners' molding starch consisting of powdered starch in admixture with from about 0.1% to about 0.25% of a member of the group consisting of triesters of citric acid with aliphatic monohydric alcohols containing 2 to 4 carbon atoms and the monoacetyl derivatives of such triesters.

2. A confectioners' molding starch consisting of powdered starch in admixture with from about 0.1% to about 0.25% of triethyl citrate.

3. A confectioners' molding starch consisting of powdered starch in admixture with from about 0.1% to about 0.25% of acetyl triethyl citrate.

4. A confectioners' molding starch consisting of powdered starch in admixture with from about 0.1% to about 0.25% of acetyl tributyl citrate.

5. A confectioners' molding starch consisting of powdered starch in admixture with from about 0.1% to about 0.25% of tripropyl citrate.

6. A confectioners' molding starch consisting of powdered starch in admixture with from about 0.1% to about 0.25% of acetyl tripropyl citrate.

References Cited by the Examiner

UNITED STATES PATENTS 3,074,803   1/1963   McGowan et al. _____ 106—38.5

ALEXANDER H. BRODMERKEL, *Primary Examiner.*